(12) United States Patent
Shin et al.

(10) Patent No.: US 8,690,409 B2
(45) Date of Patent: Apr. 8, 2014

(54) BACKLIGHT ASSEMBLY AND DISPLAY APPARATUS HAVING THE SAME

(75) Inventors: Dong-Lyoul Shin, Suwon-si (KR); Jae-Chang Choi, Yongin-si (KR); Tae-Ho Lee, Seoul (KR); Je-Won Woo, Seoul (KR); Su-Chang Ryu, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 65 days.

(21) Appl. No.: 13/399,932

(22) Filed: Feb. 17, 2012

(65) Prior Publication Data

US 2012/0236588 A1 Sep. 20, 2012

(30) Foreign Application Priority Data

Mar. 16, 2011 (KR) .......................... 10-2011-0023464

(51) Int. Cl.
*F21V 7/04* (2006.01)

(52) U.S. Cl.
USPC ........... 362/606; 362/600; 362/609; 362/613; 362/615; 362/621

(58) Field of Classification Search
USPC ........... 362/84, 225, 227, 235, 244, 245, 247, 362/296.01, 311.01, 311.02, 558, 600, 606, 362/609, 613, 615, 621, 612
See application file for complete search history.

(56) References Cited

U.S. PATENT DOCUMENTS

| | | | |
|---|---|---|---|
| 2001/0003504 A1* | 6/2001 | Ishihara et al. | 362/31 |
| 2008/0074898 A1* | 3/2008 | Sommer et al. | 362/583 |
| 2010/0142220 A1* | 6/2010 | Lee et al. | 362/609 |
| 2010/0309407 A1* | 12/2010 | Shimura | 349/62 |
| 2011/0063870 A1* | 3/2011 | Nomoto et al. | 362/551 |
| 2011/0134658 A1* | 6/2011 | Shen | 362/609 |

FOREIGN PATENT DOCUMENTS

| | | |
|---|---|---|
| JP | 2000-214333 A | 8/2000 |
| JP | 2002-270023 A | 9/2002 |
| JP | 3387439 B2 | 1/2003 |
| KR | 0912695 B1 | 8/2009 |

* cited by examiner

*Primary Examiner* — Britt D Hanley
*Assistant Examiner* — Kevin Quarterman
(74) *Attorney, Agent, or Firm* — Innovation Counsel LLP

(57) ABSTRACT

A backlight assembly includes a light guiding plate and a plurality of first light sources. The light guiding plate includes a light exiting surface through which light can exit, a light guiding surface positioned opposite to the light exiting surface, and a first surface extending between the light guiding surface and the light exiting surface and inclined with respect to the light guiding surface by a first angle. The first angle is an acute angle. The first light sources can generate light, and are disposed under the light guiding plate. These first light sources are disposed adjacent to a first edge connecting the first surface with the light guiding surface.

15 Claims, 8 Drawing Sheets

BACKLIGHT ASSEMBLY AND DISPLAY APPARATUS HAVING THE SAME

CROSS-REFERENCE TO RELATED APPLICATION

This application claims priority under 35 U.S.C. §119 to Korean Patent Application No. 2011-0023464, filed on Mar. 16, 2011, in the Korean Intellectual Property Office (KIPO), the contents of which are herein incorporated by reference in their entireties.

BACKGROUND OF THE INVENTION

1. Field of the Invention

Example embodiments of the present invention relate generally to flat panel displays. More particularly, example embodiments of the present invention relate to a backlight assembly for a flat panel display, the backlight assembly having a light guiding plate, as well as a display apparatus having the backlight assembly.

2. Discussion of the Related Art

Generally, a display apparatus includes a display panel and a backlight assembly supplying light to the display panel. The backlight assembly is classified into an edge-illumination type and a direct-illumination type according to a position of a light source. The edge-illumination type backlight assembly includes a light guiding plate for guiding light from the light source to be provided to the display panel.

The light guiding plate commonly includes a light exiting surface through which the light exits, a reflecting surface opposite to the light exiting surface, and side surfaces substantially perpendicular to the reflecting surface and extending between the reflecting surface and the light exiting surface. The light source is disposed adjacent to at least one of the side surfaces, whereupon the light source supplies light to the light guiding plate.

However, because the light source is disposed adjacent to the side surface of the light guiding plate, edge-illumination type backlight assemblies have a bezel width that is at least as wide as the light source. In fact, the height of the side surface of the light guiding plate is typically larger than that of the light source facing the side surface, in order to decrease loss of light provided to the display panel. This can be an impediment to reducing the thickness of display apparatuses that include an edge-illumination type backlight assembly.

SUMMARY OF THE INVENTION

Example embodiments of the present invention provide a backlight assembly having reduced thickness and size, yet still efficiently supplying light.

Example embodiments of the present invention also provide a display apparatus incorporating the backlight assembly.

According to an example embodiment of the present invention, the backlight assembly includes a light guiding plate and a plurality of first light sources. The light guiding plate includes a light exiting surface through which light can exit, a light guiding surface opposite to the light exiting surface, and a first surface extending between the light guiding surface and the light exiting surface, the first surface inclined with respect to the light guiding surface by a first angle. The first angle is an acute angle. The first light sources are configured to generate the light. The first light sources are disposed under the light guiding plate, and disposed adjacent to a first edge that connects the first surface with light guiding surface.

In an example embodiment, the light guiding surface may include an incident portion positioned to receive the light, and a reflecting portion for reflecting the light. The reflecting portion may extend from the incident portion to be disposed substantially coplanar with the incident portion.

In an example embodiment, the backlight assembly may include a first reflecting cover disposed on the first surface and having a width of a first projected plane larger than a width of the incident portion under which the first light sources are disposed. The first projected plane may be a projection of the first surface onto the light guiding surface.

In an example embodiment, the first reflecting cover may include silver (Ag).

In an example embodiment, the incident portion of the light guiding plate may include a convex and concave surface.

In an example embodiment, the backlight assembly may further include a light source lens disposed between the incident portion and the first light sources. The light source lens may be configured to diffuse the light.

In an example embodiment, the backlight assembly may further include a second reflecting cover disposed on a second surface of the light guiding plate and configured to reflect the light, a reflecting sheet disposed under the light guiding surface and positioned to correspond to the reflecting portion, and a light controller disposed over the light exiting surface and configured to control the light. The second surface may be opposite to the first surface of the light guiding plate. The second reflecting cover and the reflecting sheet may include substantially a same material.

In an example embodiment, the backlight assembly may further include a first reflecting cover. The first reflecting cover may include first, second and third reflecting cover portions. When a width of a first projected plane which is a projection of the first surface on the light guiding surface is less than or equal to a width of the incident portion under which the first light sources are disposed, and the first reflecting cover may be disposed on the first surface so as to reflect the light. The second reflecting cover portion may extend from a first end portion of the first reflecting cover portion, and partially cover the light exiting surface. The third reflecting cover portion may extend from a second end portion of the first reflecting cover portion so as to partially cover the light guiding surface, where the second end portion is positioned opposite to the first end portion.

In an example embodiment, the backlight assembly may further include a plurality of second light sources disposed under the light guiding plate and disposed adjacent to a second edge connecting a second surface of the light guiding plate with the light guiding surface. The second surface of the light guiding plate may be opposite to the first surface of the light guiding plate and be inclined with respect to the light guiding surface by a second angle which is an acute angle.

In an example embodiment, the backlight assembly may further include a second reflecting cover disposed on the second surface and configured to reflect the light. A width of a second projected plane is larger than a width of the incident portion under which the second light sources are disposed. The second projected plane may be a projection of the second surface onto the light guiding surface.

In an example embodiment, the second reflecting cover may include silver (Ag).

According to another example embodiment of the present invention, a display apparatus includes a backlight assembly and a display panel. The backlight assembly includes a light guiding plate and a plurality of first light sources. The light guiding plate includes a light exiting surface through which light can exit, a light guiding surface opposite to the light exiting surface, and a first surface extending between the light guiding surface and the light exiting surface, the first surface inclined with respect to the light guiding surface by a first angle. The first angle is an acute angle. The first light sources are configured to generate the light and are disposed under the light guiding plate, and disposed adjacent to a first edge of the light guiding plate, the first edge connecting the first surface with the light guiding surface. The display panel is disposed over the backlight assembly for displaying an image using the light.

In an example embodiment, the light guiding surface may include an incident portion positioned to receive the light, and a reflecting portion for reflecting the light. The reflecting portion may extend from the incident portion substantially coplanar with the incident portion.

In an example embodiment, the display apparatus may further include a receiving container. The receiving container may include a bottom plate and sidewalls extending from the bottom plate so as to define a receiving space in which the backlight assembly is disposed.

In an example embodiment, the display apparatus may further include a heatsink disposed between the light guiding surface and the receiving container. The heatsink may be coupled to a bottom plate of the first light source so as to dissipate heat generated from the first light source.

In an example embodiment, the heatsink may include a first heatsink portion positioned proximate to the incident portion and a second heatsink portion positioned proximate to the reflecting portion. The second heatsink portion may be positioned closer to the light guiding plate than the first heatsink portion.

In an example embodiment, the bottom plate of the receiving container may include a first bottom plate positioned proximate to the first heatsink portion and a second bottom plate positioned proximate to the second heatsink portion. The second bottom plate may be positioned closer to the light guiding plate than the first bottom plate.

In an example embodiment, the heatsink may include a first heatsink portion positioned proximate to the incident portion and a second heatsink portion positioned proximate to the reflecting portion. A thickness of the second heatsink portion may be larger than a thickness of the first heatsink portion.

In an example embodiment, the bottom plate of the receiving container may include a first bottom plate positioned proximate to the first heatsink portion and a second bottom plate positioned proximate to the second heatsink portion. A perpendicular distance between the incident portion and the first bottom plate may be substantially the same as a perpendicular distance between the reflecting portion and the second bottom plate.

According to the backlight assembly and the display apparatus having the backlight assembly, a light source part is disposed under a light guiding plate, so that size of a bezel of a display apparatus may be decreased. In addition, the thickness of the display apparatus may be decreased.

Furthermore, a first surface of a light guiding plate is inclined with respect to a light guiding surface by a first angle which is an acute angle, and a first reflecting cover is disposed on the first surface, so that light provided from the light source part may be more effectively supplied to a display panel.

In addition, a second surface of a light guiding plate is inclined with respect to the light guiding surface by a second angle which is an acute angle, and a second reflecting cover is disposed on the second surface, so that the light provided from the light source part may be effectively supplied to a display panel, and a brightness of the display apparatus may be increased.

In addition, the display apparatus further include a heatsink, so that heat generated from the light source part is more efficiently dissipated.

BRIEF DESCRIPTION OF THE DRAWINGS

The above and other features of the present invention will become more apparent by describing in detail example embodiments thereof with reference to the accompanying drawings, in which.

DETAILED DESCRIPTION OF EXAMPLE EMBODIMENTS

Hereinafter, the present invention will be explained in detail with reference to the accompanying drawings.

Figure 1:
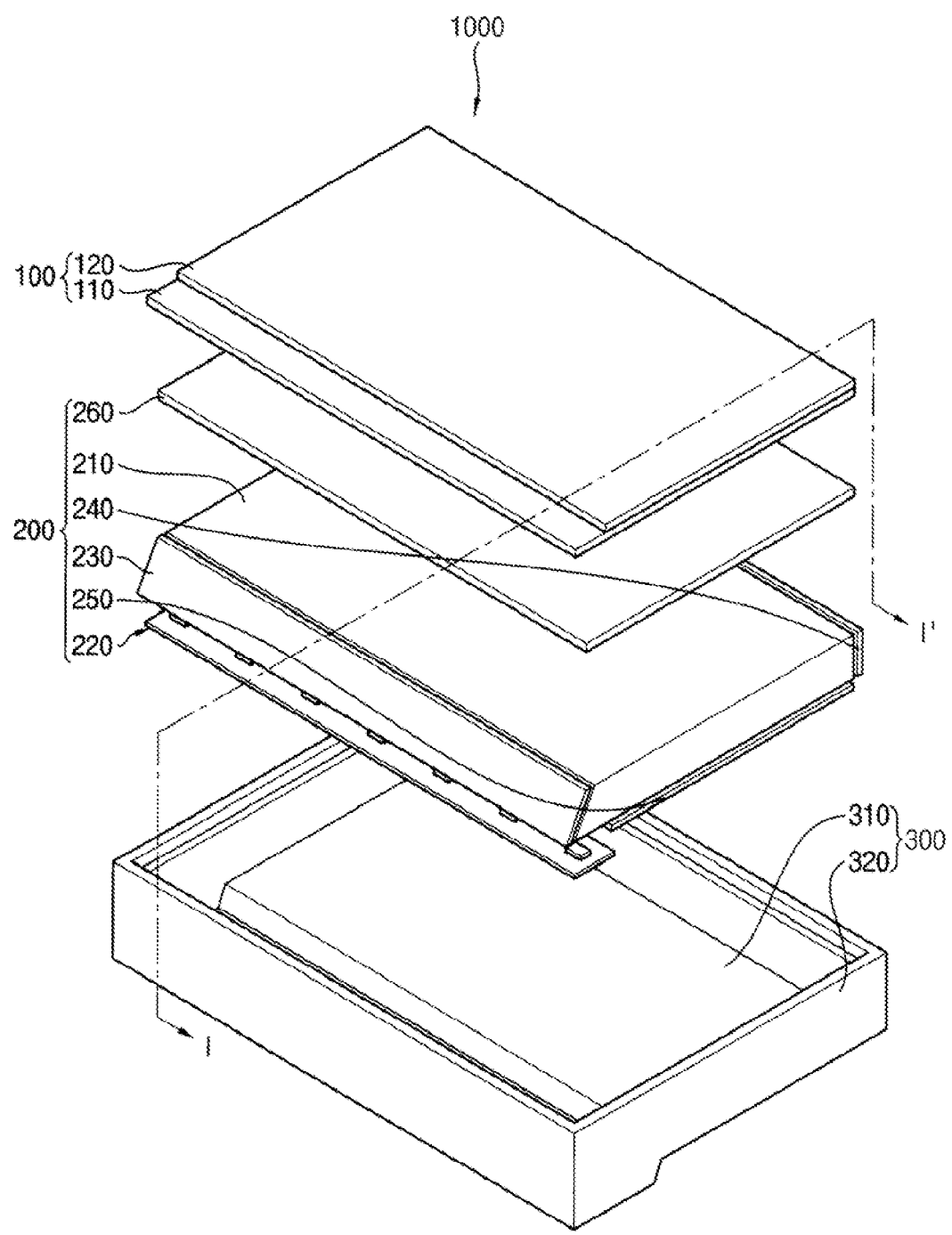
FIG. 1 is an exploded perspective view illustrating a display apparatus according to an example embodiment of the present invention.
Figure 2:
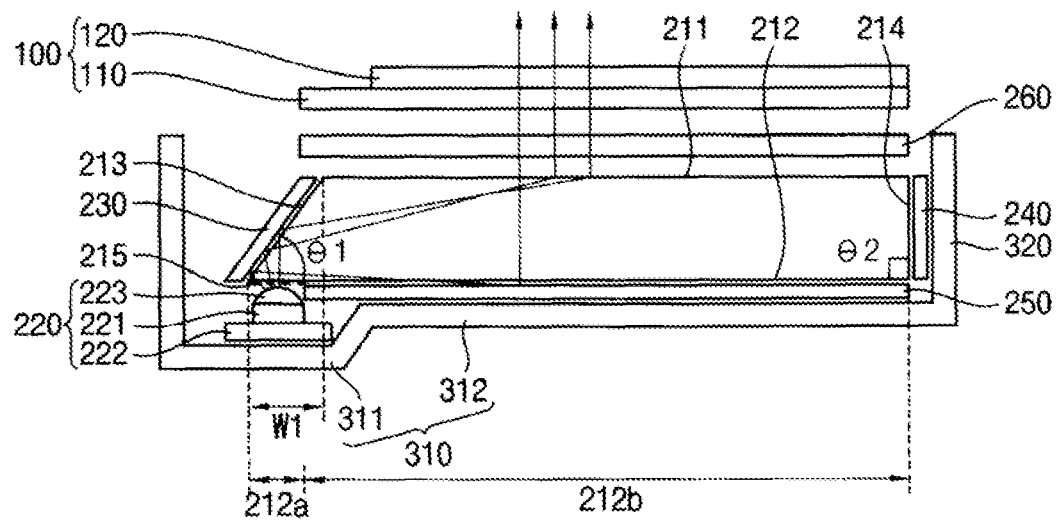
FIG. 2 is a cross-sectional view taken along a line I-I' of FIG. 1.

FIG. 1 is an exploded perspective view illustrating a display apparatus according to an example embodiment of the present invention. FIG. 2 is a cross-sectional view taken along line I-I' of FIG. 1.

Referring to FIGS. 1 and 2, a display apparatus 1000 includes a display panel 100, a backlight assembly 200 and a receiving container 300.

The display panel 100 includes a first substrate 110, a second substrate 120 facing the first substrate 110, and a liquid crystal layer (not shown) disposed between the first and second substrates 110 and 120. An image is displayed from the display panel 100, using light from the backlight assembly 200.

The backlight assembly 200 includes a light guiding plate 210, a light source 220, a first reflecting cover 230, a second reflecting cover 240, a reflecting sheet 250 and a light controller 260.

The light guiding plate 210 includes a light exiting surface 211, a light guiding surface 212, a first surface 213 and a second surface 214. Light supplied from the light source part 220 or reflected from the first reflecting cover 230, the second reflecting cover 240 and/or the reflecting sheet 250 is supplied to the display panel 100 through the light exiting surface 211. The light guiding surface 212 is opposite to the light exiting surface 211, and includes an incident portion 212*a* and a reflecting portion 212*b*. The light from the light source part 220 is incident to the incident portion 212*a* of the light guiding surface 212. The reflecting portion 212*b* extends from the incident portion 212*a* to be disposed in a plane substantially the same as that of the incident portion 212a. The light reflected from the reflecting sheet 250 passes through the reflecting portion 212b and into the light guiding plate 210. Here, the incident portion 212a is disposed adjacent to an edge connecting the first surface 213 with the light guiding surface 212.

The first surface 213 connects a first edge of the light exiting surface 211 with a first edge of the light guiding surface 212. As described in FIG. 2, the first surface 213 is inclined with respect to the light guiding surface 212 by a first angle $\theta 1$. In this case, the first angle $\theta 1$ is an acute angle.

The first angle $\theta 1$ may have a magnitude such that the width of a projected plane W1 is larger than the width of a light source 221. The projected plane W1 is a projection of the first surface 213 onto the light guiding surface 212. Thus, described hereinafter, when the first reflecting cover 230 is disposed on the first surface 213, the light from the light source 221 is substantially completely reflected from the first reflecting cover 230 and guided to the interior of the light guiding plate 210. Thus, an amount of light leaking from the light source 221 to the outside may be reduced or minimized.

As mentioned above, the first angle $\theta 1$ is formed so that the width of the projected plane W1 is larger than the width of the light source 221. Thus, the first angle $\theta 1$ may increase as the thickness of the light guiding plate 210 increases, and decrease as the thickness of the light guiding plate 210 decreases. For example, when the thickness of the light guiding plate 210 is about 2 mm and the width of the light source 221 is about 3 mm, then the first angle $\theta 1$ may be about 25°. Alternatively, when the thickness of the light guiding plate 210 is about 3 mm and the width of the light source 221 is about 3 mm, the first angle $\theta 1$ may be about 35°. Other angles are also contemplated.

Since a plurality of light sources 221 are present, the first angle $\theta 1$ may be determined such that the width of the projected plane W1 is larger than or equal to the width of the incident portion 212a instead of considering the width of a specific light source, so that the first angle $\theta 1$ may be more easily designed. In this case, the width of the incident portion 212a is larger than the width of the light source 221. As the width of the projected plane W1 increases, loss of light may be minimized. Thus, the first angle $\theta 1$ may be determined according to the width of the incident portion 212a.

The second surface 214 is opposite to the first surface 213, and connects a second edge of the light exiting surface 211 with a second edge of the light guiding surface 212. The second edge of the light exiting surface 211 is opposite to the first edge of the light exiting surface 211. The second edge of the light guiding surface 212 is opposite to the first edge of the light guiding surface 212. As illustrated in FIG. 2, the second surface 214 is inclined with respect to the light guiding surface 212 by a second angle $\theta 2$ when viewed in a cross-section. The second angle $\theta 2$ may be about 90°, although $\theta 2$ can also be any other suitable angle.

The light guiding plate 210 may further include a convex and concave portion 215, or generally uneven surface, on incident portion 212a. The convex and concave portion 215 may be formed by printing on the incident portion 212a. The convex and concave portion 215 may diffuse light from the light source part 220, and supply the diffused light to the light guiding plate 210.

The light source part 220 includes a plurality of light sources 221. The light sources 221 are disposed under the light guiding plate in a line, and disposed adjacent to the incident portion 212a (which, here, is positioned at the edge of the light guiding surface 212 connecting the first surface 213 with the light guiding surface 212). The light sources 221 supply light to the incident portion 212a. The light sources 221 are disposed under the light guiding plate 210, not at a side of the light guiding plate 210, so that bezel width of the display apparatus 1000 as illustrated in FIG. 1 may be decreased to less than the width of the light source 221.

In addition, when the light source is disposed adjacent to a side of the light guiding plate, the thickness of the light guiding plate should be larger than the width of the light source to minimize loss of light from the light source. Alternatively, in the display apparatus 1000 as illustrated in FIG. 1, the thickness of the light guiding plate 210 need not be a factor of the width of the light source 221 or the light source part 220 at all, so that the thickness of the display apparatus 1000 may be even further decreased.

The light sources 221 may be directly mounted on the receiving container 300, and the light source part 220 may further include a printed circuit board 222 and a plurality of light source lenses 223.

The printed circuit board 222 is disposed under the light sources 221, and has the light sources 221 mounted thereon in a line. The printed circuit board 222 supplies an electrical signal to the light sources 221. As illustrated in FIG. 1, when the light source part 220 further includes the printed circuit board 222, the printed circuit board 222 is disposed under the light guiding plate 210 and the light sources 221, so that the bezel width of the display apparatus 1000 may be decreased by the width of the light source 221 and the printed circuit board 222.

In addition, the printed circuit board 222 may be disposed in the receiving container 300.

Each of the light source lenses 223 may be disposed between the light guiding plate 210 and each of the light sources 221. For example, each of the light source lenses 223 is positioned above each of the top surfaces of the light sources 221, and provides light from the light sources 221 to the incident portion 212a of the light guiding surface 212 of the light guiding plate 210. In this case, the light source lenses 223 diffuse or condense the light, and provide this light to the light guiding plate 210. Thus, the light source part 220 further includes the light source lenses 223, so that an incident angle of the light from the light source 221 may be controlled.

The first reflecting cover 230 is disposed on the first surface 213. The first reflecting cover 230 may include any suitable reflective material, such as silver (Ag). As one example, the first reflecting cover 230 may be attached to the first surface 213 by a transparent adhesive. The first reflecting cover 230 reflects light from the light source 221. The light reflected by the first reflecting cover 230 is directed into the light guiding plate 210. The light incident into the light guiding plate 210 is provided to the light exiting surface 211 or the reflecting portion 212b.

As illustrated in FIG. 1, the light source 221 is disposed adjacent to the incident portion 212a which is adjacent to the edge connecting the first surface 213 with the light guiding surface 212. Thus, light which advances to the first surface 213 should be reflected back into the light guiding plate 210 again. Thus, the light provided to the light guiding plate 210 from the light source 221 may be more effectively provided to the entire display panel 100. Accordingly, the first reflecting cover 230 is disposed on the first surface 213, so that the light advancing to the first surface 213 from the light source 221 may be reflected to be incident into the light guiding plate 210 again.

The second reflecting cover 240 is disposed on the second surface 214. For example, the second reflecting cover 240 may be attached to the second surface 214 by a transparent adhesive. The second reflecting cover 240 reflects the light provided from the second surface 214. The light reflected by the second reflecting cover 240 falls incident to the light guiding plate 210. The light incident into the light guiding plate 210 is eventually provided to the light exiting surface 211 or the reflecting portion 212b.

The reflecting sheet 250 is disposed under the reflecting portion 212b of the light guiding plate 210. The reflecting sheet 250 reflects the light provided from the reflecting portion 212b back into the light guiding plate 210 again. Thus, the loss of the light may be reduced or minimized.

The light controller 260 is disposed over the light guiding plate 210. The light controller 260 may include at least one of a light diffusing sheet, a prism sheet and a light condensing sheet.

The receiving container 300 includes a bottom plate 310, and sidewalls 320 extending from the bottom plate 310 in a direction substantially perpendicular to the bottom plate 310. A receiving space is defined by the bottom plate 310 and the sidewalls 320. The backlight assembly 200 is received in the receiving space.

As illustrated in FIGS. 1 and 2, the bottom plate 310 is folded at a portion corresponding to a boundary between the incident portion 212a and the reflecting portion 212b, to produce two different elevations. Thus, the bottom plate 310 is divided into a first bottom plate 311 corresponding to the incident portion 212a and a second bottom plate 312 corresponding to the reflecting portion 212b. The light source part 220 is disposed between the first bottom plate 311 and the light guiding plate 210. However, the light source part 220 is not disposed between the second bottom plate 312 and the light guiding plate 210, so that the second bottom plate 312 is disposed closer to the light guiding plate 210 than the first bottom plate 311.

The light sources 221, or the printed circuit board 222 on which the light sources 221 are mounted, directly contact (or are otherwise thermally coupled to) the first bottom plate 311, so that heat generated from the light sources 221 is dissipated through the first bottom plate 311 and the second bottom plate 312. Thus, the receiving container 300 includes a metal having relatively high heat conductivity, so that the heat from the light sources 221 may be more easily dissipated.

The bottom plate 310 of the receiving container 300 has the above-mentioned dual-elevation structure, so that height of sidewall 320 extending from the first bottom plate 311 toward the display panel 100 may be greater than height of sidewall 320 extending from the second bottom plate 312 toward the display panel 100.

As above, in the display apparatus 1000, the width of the projected plane W1 is larger than or equal to width of the light source 221, and the first reflecting cover 230 is disposed on the first surface 213. Thus, the display apparatus 1000 may minimize loss of light, and more effectively supply light to the light exiting surface 211.

Figure 3:
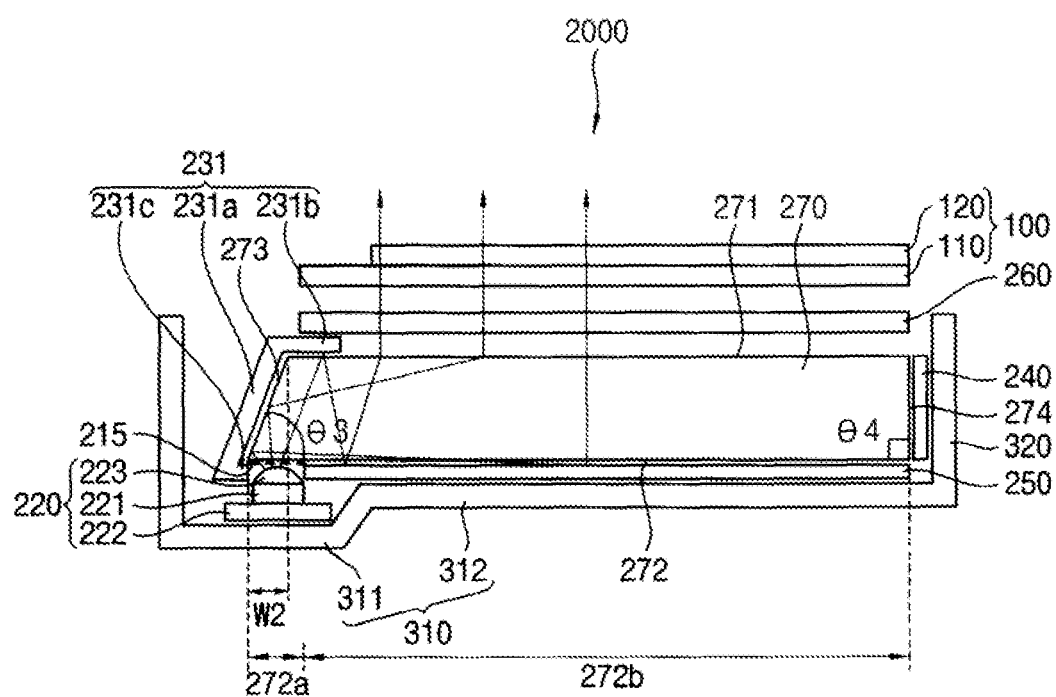
FIG. 3 is a cross-sectional view according to another example embodiment of the present invention.

FIG. 3 is a cross-sectional view according to another example embodiment of the present invention.

A display apparatus according to the present example embodiment illustrated in FIG. 3 is substantially the same as the display apparatus according to the previous example embodiment illustrated in FIG. 1, except for a first angle between a first surface and a light guiding surface, and a shape of a first reflecting cover disposed on the first surface. Thus, the same reference numerals will be used to refer to the same or like parts as those described in the previous example embodiment in FIG. 1, and any further repetitive explanation concerning the above elements will be largely omitted.

Referring to FIG. 3, a display apparatus 2000 includes a light guiding plate 270, a light source part 220 (as illustrated in FIGS. 1 and 2), a first reflecting cover 231, a second reflecting cover 240 (as illustrated in FIGS. 1 and 2), a reflecting 250 sheet (as illustrated in FIGS. 1 and 2), a light controller 260 (as illustrated in FIGS. 1 and 2), and a receiving container 300 (as illustrated in FIGS. 1 and 2).

The light guiding plate 270 includes a light exiting surface 271, a light guiding surface 272, a first surface 273 and a second surface 274. Light supplied from the light source part 220 or light reflected from the first reflecting cover 231, the second reflecting cover 240 and/or the reflecting sheet 250 is supplied to the display panel 100 through the light exiting surface 271. The light guiding surface 272 is opposite to the light exiting surface 271, and includes an incident portion 272a and a reflecting portion 272b. The light from the light source part 220 falls incident to the incident portion 272a. The reflecting portion 272b extends from an end of the incident portion 272a, and is disposed in a plane substantially the same as the incident portion 272a. Light reflected from the reflecting sheet 250 passes through the reflecting portion 272b and into the light guiding plate 270. The incident portion 272a is disposed adjacent to an edge connecting the first surface 273 with the light guiding surface 272.

The first surface 273 connects a first edge of the light exiting surface 271 with a first edge of the light guiding surface 272. As described in FIG. 3, the first surface 273 is inclined with respect to the light guiding surface 272 by a first angle θ3 when viewed on a cross-section. In this case, the first angle θ3 is an acute angle, although other angles are contemplated as well.

The first angle θ3 may be formed such that width of a projected plane W2 is less than or equal to width of a light source 221. The projected plane is a projection of the first surface 273 onto the light guiding surface 272. Thus, as described hereinafter, when the first reflecting cover 231 is disposed on the first surface 273, a portion of the light exiting surface 271 extending from the first edge of the first surface 273, and a portion of the light guiding surface 272 extending from the second edge of the first surface 273, light from the light source 221 is substantially completely reflected from the first reflecting cover 231 and guided into the light guiding plate 270. That is, substantially all light emitted from the light source 221 is directed into the light guiding plate 270. Thus, the amount of light leaking from the light source 221 to outside may be minimized.

The second surface 274 is opposite to the first surface 273, and connects a second edge of the light exiting surface 271 with a second edge of the light guiding surface 272. As illustrated in FIG. 3, the second surface 274 is inclined with respect to the light guiding surface 272 by a second angle θ4 when viewed on a cross-section. The second angle θ4 may be about 90°, although any other angle is contemplated.

The first reflecting cover 231 includes a first reflecting cover portion 231a, a second reflecting cover portion 231b and a third reflecting cover portion 231c. The first reflecting cover portion 231a is disposed on the first surface 273. The second reflecting cover portion 231b extends from a first edge of the first reflecting cover portion 231a and is disposed on a portion of the light exiting surface 271 extending from the first edge of the first surface 273. The third reflecting cover portion 231c extends from a second edge of the first reflecting cover portion 231a that is opposite to its first edge, and is disposed on a portion of the light guiding surface 272 extending from the second edge of the first surface 273 opposite to the first edge of the first surface 273.

In addition, the first reflecting cover 231 may include silver (Ag). For example, the first reflecting cover 231 may be attached to the first surface 273, a portion of the light exiting surface 271 extending from the first edge of the first surface 273, and/or a portion of the light guiding surface 272 extending from the second edge of the first surface 273 by a transparent adhesive.

Thus, the first reflecting cover 231 may reflect light that passes through the first surface 273, a portion of the light exiting surface 271 extending from the first edge of the first surface 273, and a portion of the light guiding surface 272 extending from the second edge of the first surface 273, so as to direct this light back into the light guiding plate 270 again. Thus, the light reflected back into the light guiding plate 270 may eventually exit through the light exiting surface 271.

Therefore, in the display apparatus 2000 illustrated in FIG. 3, when the width of the projected plane W2 is less than or equal to width of the light source 221, the first reflecting cover 231 is disposed on the first surface 273, a portion of the light exiting surface 271 extending from the first edge of the first surface 273, and a portion of the light guiding surface 272 extending from the second edge of the first surface 273, light may be guided to the light guiding plate 270 substantially without leakage, so as to increase efficiency of the light exiting through the light exiting surface 271.

Figure 4:
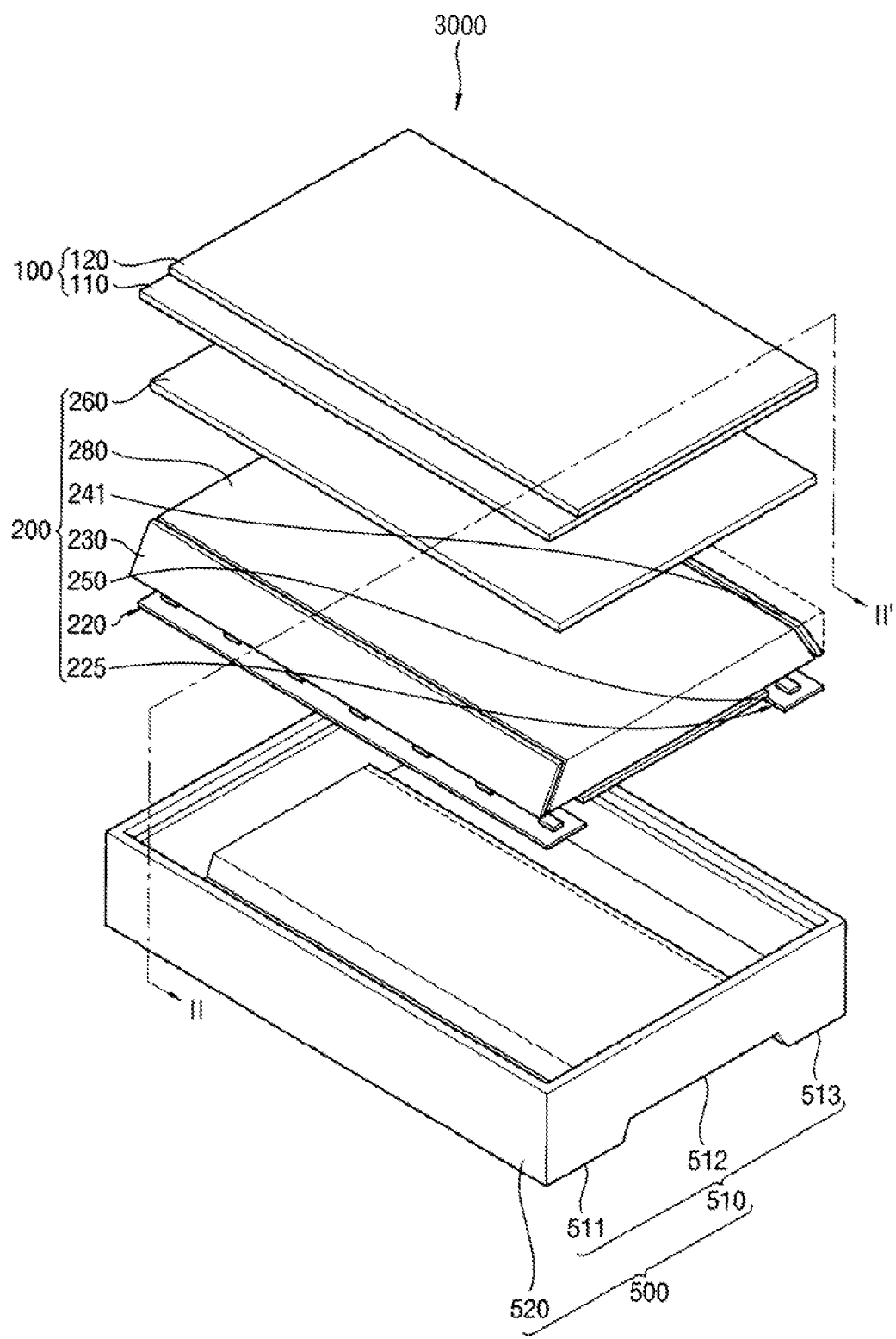
FIG. 4 is an exploded perspective view illustrating a display apparatus according to still another example embodiment of the present invention.

FIG. 4 is an exploded perspective view illustrating a display apparatus according to still another example embodiment of the present invention.

A display apparatus according to the present example embodiment illustrated in FIG. 4 is substantially the same as the display apparatus according to the previous example embodiment illustrated in FIG. 1, except that the display apparatus further includes a second light source part, and a shape of the light guiding plate and a shape of the receiving container are different. Thus, the same reference numerals will be used to refer to the same or like parts as those described in the previous example embodiment in FIG. 1, and any further repetitive explanation concerning the above elements will be largely omitted.

Figure 5:
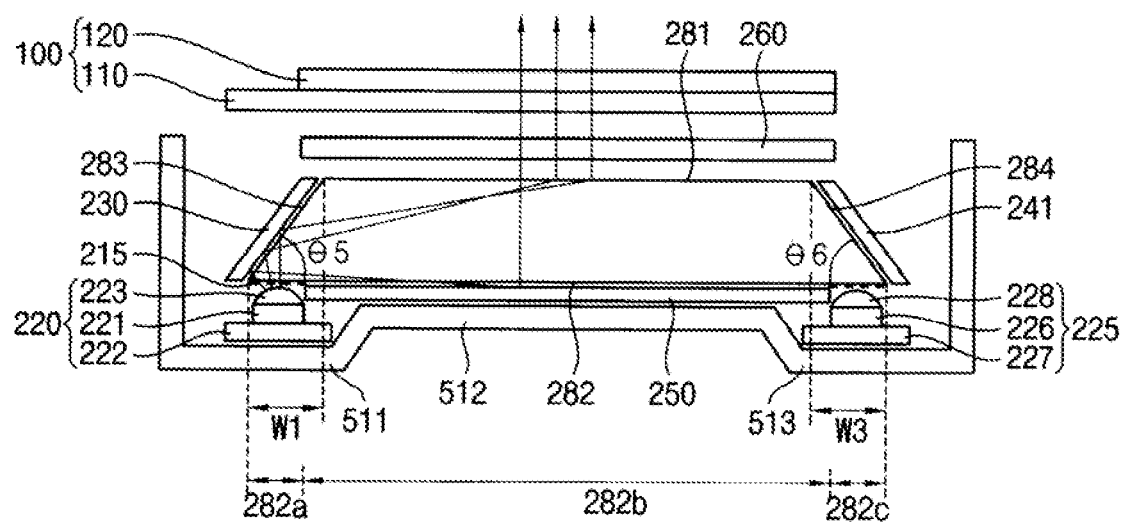
FIG. 5 is a cross-sectional view taken along a line II-II' of FIG. 4.

Referring to FIGS. 4 and 5, the display apparatus 3000 includes the display panel 100, a backlight assembly 400 and a receiving container 500.

The backlight assembly 400 includes a light guiding plate 280, the first light source part 220, a second light source part 225, the first reflecting cover 230, a second reflecting cover 241, the reflecting sheet 250 and a light controller 260.

The light guiding plate 280 includes a light exiting surface 281, a light guiding surface 282, a first surface 283 and a second surface 284. Light supplied from the first and second light source parts 220 and 225 or light reflected from the first reflecting cover 230, the second reflecting cover 240 and/or the reflecting sheet 250 is supplied to the display panel 100 through the light exiting surface 281. The light guiding surface 282 is opposite to the light exiting surface 281, and includes a first incident portion 282a, a second incident portion 282c and a reflecting portion 282b. The light from the first and second light source parts 220 and 225 is respectively incident into the first and second incident portions 282a and 282c. The reflecting portion 282b extends between, and is substantially coplanar with, the first and second incident portions 282a and 282c. The light reflected off of the reflecting sheet 250 passes through the reflecting portion 282b and is supplied back into an inside of the light guiding plate 280. The first and second incident portions 282a and 282c are respectively disposed adjacent to edges connecting the first surface 283 with the light guiding surface 282, and connecting the second surface 284 with the light guiding surface 282.

The first surface 283 connects a first edge of the light exiting surface 281 with a first edge of the light guiding surface 282. As described in FIG. 5, the first surface 283 is inclined with respect to the light guiding surface 282 by a first angle $\theta 5$ when viewed on a cross-section. In this case, the first angle $\theta 5$ is an acute angle.

The second surface 284 is opposite to the first surface 283, and connects a second edge of the light exiting surface 281 with a second edge of the light guiding surface 282. The second edge of the light exiting surface 281 is opposite to the first edge of the light exiting surface 281. As described in FIG. 5, the second surface 284 is inclined with respect to the light guiding surface 282 by a second angle $\theta 6$ when viewed on a cross-section. In this case, the second angle $\theta 6$ is an acute angle. Here, the second angle $\theta 6$ is substantially the same as the first angle $\theta 5$.

The first angle $\theta 5$ may be formed such that a width of a first projected plane W1 is larger than width of a first light source 221 of the first light source part 220. The first projected plane W1 is a projection of the first surface 283 onto the light guiding surface 282. Similarly, the second angle $\theta 6$ may be formed such that a width of a second projected plane W3 is larger than width of a second light source 226 of the light source part 225. The second projected plane W3 is a projection of the second surface 284 on the light guiding surface 282. When the second angle $\theta 6$ is substantially the same as the first angle $\theta 5$, the width of the first projected plane W1 is substantially the same as the width of second projected plane W3. Thus, as described hereinafter, when the first reflecting cover 230 is disposed on the first surface 283 and the second reflecting cover 241 is disposed on the second surface 284, the light from the first and second light sources 221 and 226 is substantially completely reflected from the first and second reflecting covers 230 and 241, and guided to be incident into the light guiding plate 280. Thus, the amount of light leaking from the first and second light sources 221 and 226 to outside may be reduced or minimized.

As explained above, the first and second angles $\theta 5$ and $\theta 6$ are formed such that the widths of the first and second projected planes W1 and W3 are larger than the widths of the first and second light sources 221 and 226, respectively. Thus, the first and second angles $\theta 5$ and $\theta 6$ may increase as the thickness of the light guiding plate 280 increases, and may decrease as the thickness of the light guiding plate 210 decreases.

In addition, the first angle $\theta 5$ and the second angle $\theta 6$ may be determined such that the widths of the first and second projected planes W1 and W3 are greater than or equal to the widths of the incident portions 282a and 282c respectively, instead of considering the width of a specific light source, so that the first angle $\theta 5$ and the second angle $\theta 6$ may be more easily designed. In this case, the width of the incident portion 282a is larger than the width of either of the first or second light sources 221 and 226. As the width of the projected plane W1 increases, the light loss may be minimized. Thus, the first angle $\theta 5$ and the second angle $\theta 6$ may be determined according to the width of the incident portion 282a.

The first light source part 220 includes a plurality of first light sources 221. The first light source part 220 may further include a first printed circuit board 222 and a plurality of first light source lenses 223. The first light sources 221 are disposed under the light guiding plate in a line, and are disposed adjacent to an edge connecting the light guiding surface 282 with the first surface 283.

The second light source part 225 includes a plurality of first light sources 226. The second light source part 225 may further include a second printed circuit board 227 and a plurality of second light source lenses 228. The second light sources 226 are disposed under the light guiding plate in a line, and are disposed adjacent to an edge connecting the light guiding surface 282 with the second surface 284. A portion adjacent to the edge connecting the light guiding surface 282 with the first surface 283 is opposite to a portion adjacent to the edge connecting the light guiding surface 282 with the second surface 284.

For example, the first and second light sources 221 and 226 are disposed under the light guiding plate, and are disposed in lines adjacent to the first and second incident portions 282a and 282c corresponding to the first and second edges, respectively. The first and second light sources 221 and 226 supply light to the first and second incident portions 282a and 282c. The first and second light sources 221 and 226 are disposed under the light guiding plate 280, not at sides of the light guiding plate 280, so that the bezel width of the display apparatus 3000 as illustrated in FIG. 4 may be decreased by an amount such as the width of the first and second light sources 221 and 226.

In addition, when the first and second light sources are disposed adjacent to a side of the light guiding plate, the thickness of the light guiding plate should be larger than the width of the light source to minimize loss of light from the light source. However, in the display apparatus 3000 as illustrated in FIG. 4, the thickness of the light guiding plate 280 may be decreased regardless of the widths of the first and second light sources 221 and 226 or the first and second light source parts 220 and 225, so that the overall thickness of the display apparatus 3000 may be decreased.

The first reflecting cover 230 may be disposed on the first surface 283. The first reflecting cover 230 may include silver (Ag). For example, the first reflecting cover 230 may be attached to the first surface 283 by a transparent adhesive. The first reflecting cover 230 reflects light from the first light source 221. The light reflected by the first reflecting cover 230 falls incident into the light guiding plate 280. The light incident into the light guiding plate 280 is provided to the light exiting surface 281 or the reflecting portion 282b.

The second reflecting cover 241 may be disposed on the second surface 284. The second reflecting cover 241 may include silver (Ag). For example, the second reflecting cover 241 may be attached on the second surface 284 by a transparent adhesive. The second reflecting cover 241 reflects light from the second light source 226. Light reflected by the second reflecting cover 241 is directed back into the light guiding plate 280. The light incident to the light guiding plate 280 is provided to the light exiting surface 281 or the reflecting portion 282b.

As illustrated in FIG. 4, the first and second light sources 221 and 226 are disposed adjacent to the first and second incident portions 282a and 282c which are edge portions of the light guiding surface 282 respectively, so that light which advances to the first surface 283 falls incident to the light guiding plate 280 again. Thus, more of the light provided to the light guiding plate 280 from the first and second light sources 221 and 226 is provided to the display panel 100.

In summary, the first and second reflecting covers 230 and 241 are respectively disposed on the first and second surfaces 283 and 284, so that the light advancing to the first and second surfaces 283 and 284 from the first and second light sources 221 and 226 may be reflected so as to fall incident to the light guiding plate 280 again.

The receiving container 500 includes a bottom plate 510 and sidewalls 520 extending from the bottom plate 510 in a direction substantially perpendicular to a plane occupied by the bottom plate 510. A receiving space is defined by the bottom plate 510 and the sidewalls 520. The backlight assembly 500 is received in the receiving space.

As illustrated in FIG. 4, the bottom plate 510 is folded at portions corresponding to a boundary between the first incident portion 282a and the reflecting portion 282b, and a boundary between the second incident portion 282c and the reflecting portion 282b. Thus, the bottom plate 510 is divided into a first bottom plate 511 corresponding to the first incident portion 282a, a second bottom plate 512 corresponding to the reflecting portion 282b and a third bottom plate 513 corresponding to the second incident portion 282c. The first light source part 220 is disposed between the first bottom plate 511 and the light guiding plate 280. The second light source part 226 is disposed between the third bottom plate 513 and the light guiding plate 280. However, the first and second light source parts 220 and 225 are not disposed between the second bottom plate 512 and the light guiding plate 280, so that the second bottom plate 512 is disposed closer to the light guiding plate 210 than the first and third bottom plates 511 and 513.

In this embodiment, the first and second light source parts 220 and 225 directly contact the first and second bottom plates 511 and 513 respectively, so that heat generated from the first and second light source parts 220 and 225 is dissipated through the first and third bottom plates 511 and 513, and the second bottom plate 512. For example, the receiving container 500 includes a metal having high heat conductivity, so that heat from the first and second light sources 221 and 226 may be more easily dissipated.

The bottom plate 510 of the receiving container 500 is configured as described above, so that height of sidewalls 520 extending from the first and third bottom plates 511 and 513 toward the display panel 100 may be greater than height of a sidewall 520 extending from the second bottom plate 512 toward the display panel 100.

Thus, the display apparatus 3000 as illustrated in FIG. 4 further includes a second light source part 225, so that overall luminance may be increased.

Figure 6:
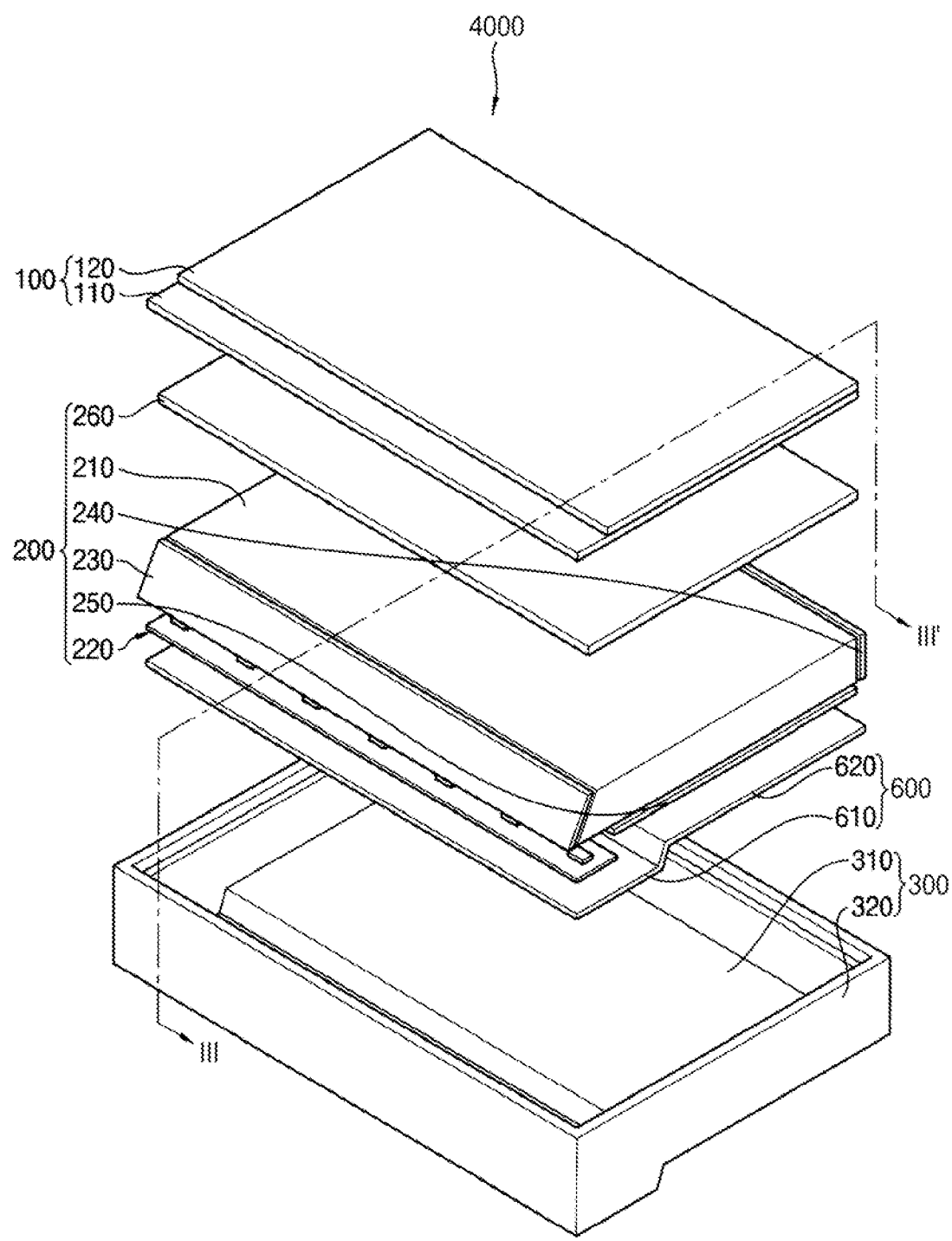
FIG. 6 is an exploded perspective view illustrating a display apparatus according to still another example embodiment of the present invention.
Figure 7:
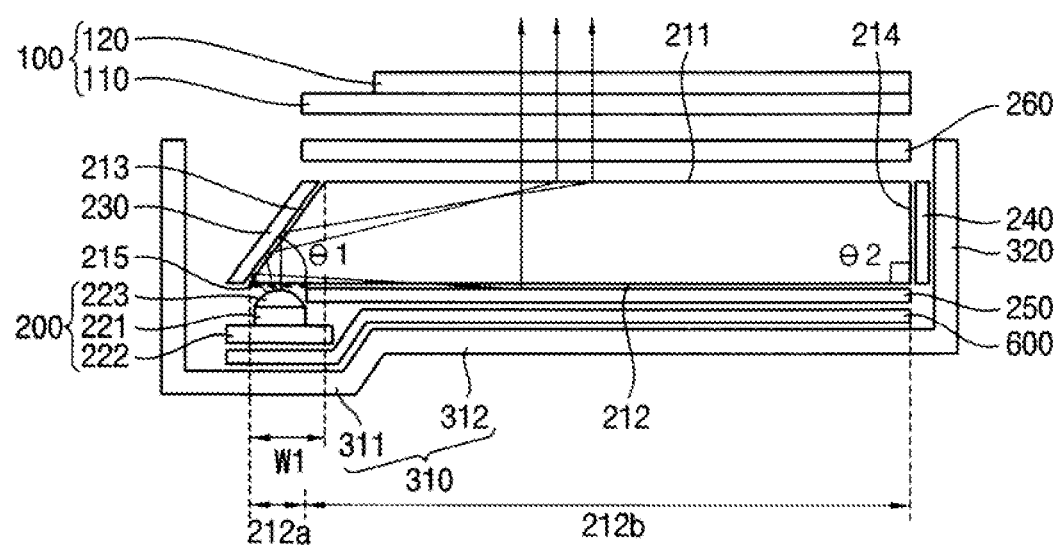
FIG. 7 is a cross-sectional view taken along a line III-III' of FIG. 6.

FIG. 6 is an exploded perspective view illustrating a display apparatus according to still another example embodiment of the present invention. FIG. 7 is a cross-sectional view taken along the line III-III' of FIG. 6.

A display apparatus according to the example embodiment of FIG. 6 is substantially the same as the display apparatus according to the previous example embodiment illustrated in FIG. 1, except that the display apparatus according to the present embodiment further includes a heatsink. Thus, the same reference numerals will be used to refer to the same or like parts as those described in the previous example embodiment in FIG. 1, and any further repetitive explanation concerning the above elements will be largely omitted.

Referring to FIGS. 6 and 7, a display apparatus 4000 includes the display panel 100, the backlight assembly 200, a heatsink 600 and the receiving container 300.

The heatsink 600 is disposed under the backlight assembly 200, and is received in the same receiving container 300 in which the backlight assembly 200 is received. The heatsink 600 is folded at a portion corresponding to a boundary between the incident portion 212a and the reflecting portion 212b. Thus, the heatsink 600 is divided into a first heatsink portion 610 corresponding to the incident portion 212a, and a second heatsink portion 620 corresponding to the reflecting portion 212b. The first heatsink portion 610 has a thickness substantially the same as the second heatsink portion 620.

The light source part 220 is disposed between the first heatsink portion 610 and the light guiding plate 210. However, the light source part 220 is not disposed between the second heatsink portion 620 and the light guiding plate 210, so that the second heatsink portion 620 is disposed closer to the light guiding plate 210 than the first heatsink portion 610.

The light sources 221 or the printed circuit board 222 directly contacts the first bottom plate 311, so that heat generated from the light sources 221 is dissipated through the first and second heatsink portions 610 and 620, and the receiving container 300. For example, at least one of the heatsink 600 and the receiving container 300 includes a metal having high heat conductivity, so as to more effectively dissipate heat from the light sources 221.

In summary, the display apparatus 4000 as illustrated in FIG. 6 further includes a heatsink 600 directly contacting the light source part 220, so that heat generated from the light source 220 may be more effectively dissipated.

Figure 8:
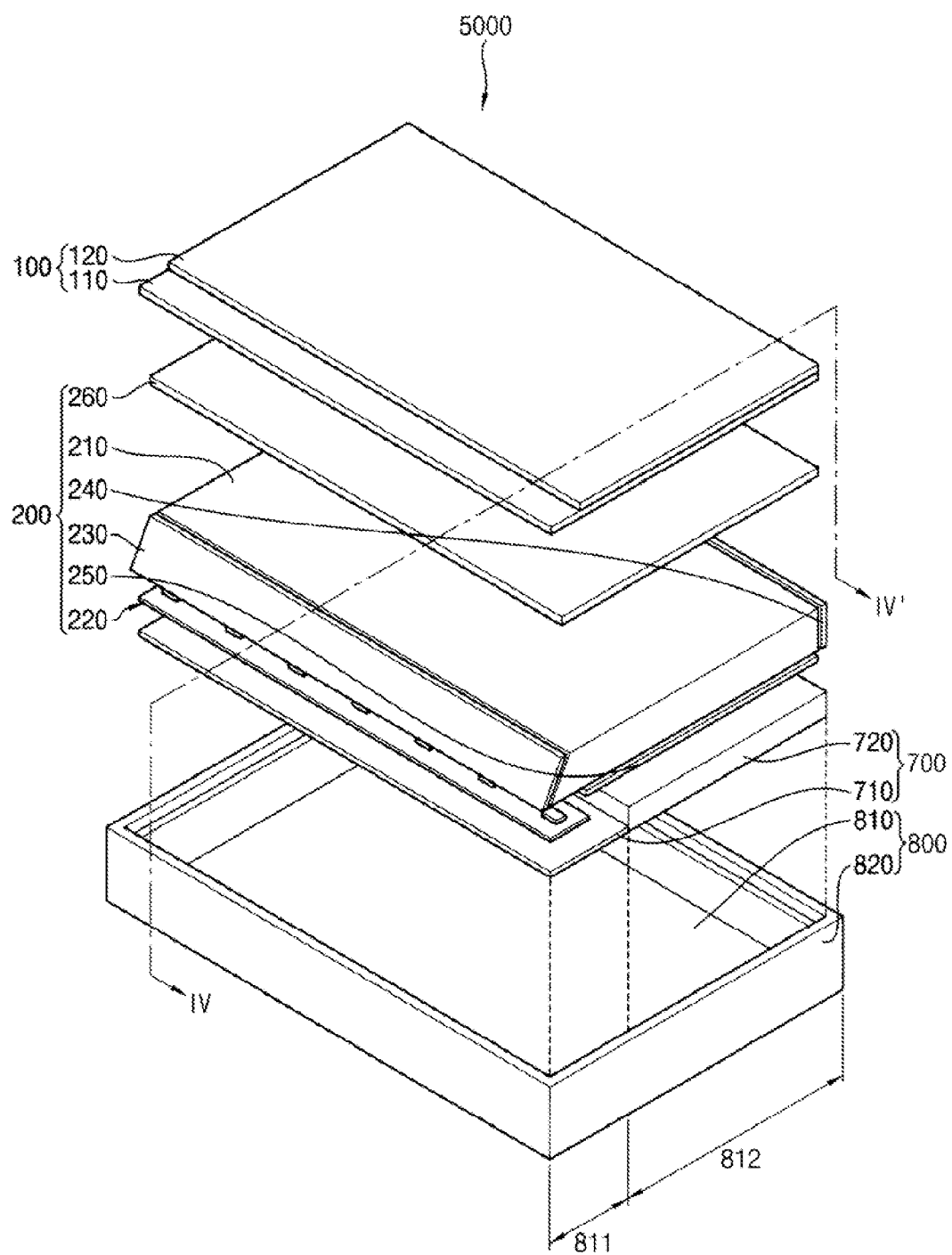
FIG. 8 is an exploded perspective view illustrating a display apparatus according to still another example embodiment of the present invention.
Figure 9:
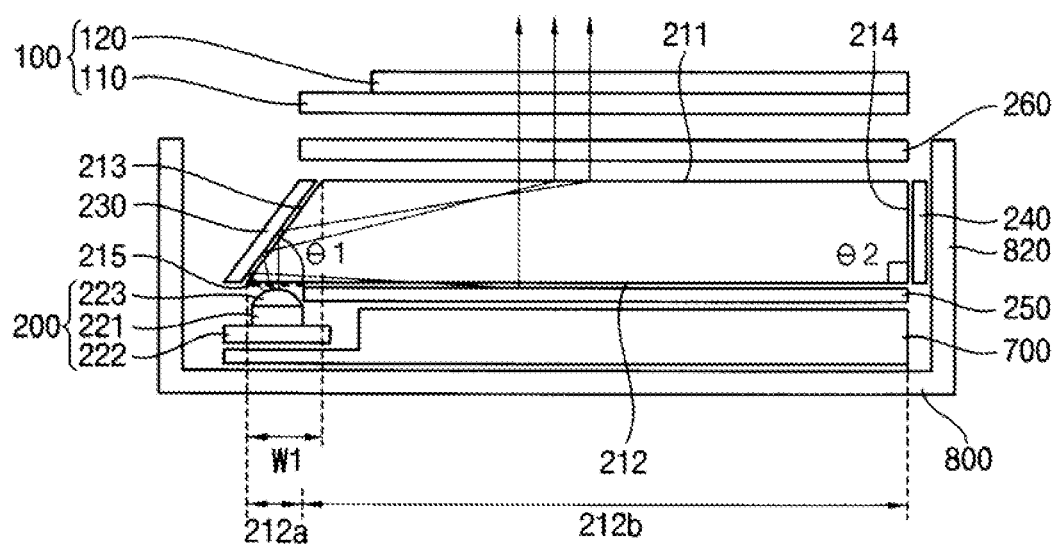
FIG. 9 is a cross-sectional view taken along a line IV-IV' of FIG. 8.

FIG. 8 is an exploded perspective view illustrating a display apparatus according to still another example embodiment of the present invention. FIG. 9 is a cross-sectional view taken along the line VI-VI' of FIG. 8.

The display apparatus illustrated in FIG. 8 is substantially the same as the display apparatus according to the previous example embodiment illustrated in FIG. 1, except for the shapes of a heatsink and a receiving container. Thus, the same reference numerals will be used to refer to the same or like parts as those described in the previous example embodiment in FIG. 1, and any further repetitive explanation concerning the above elements will be largely omitted.

Referring to FIG. 8, the display apparatus 5000 includes the display panel 100, the backlight assembly 200, a heatsink 700 and the receiving container 800.

The heatsink 700 is disposed under the backlight assembly 200, and is received in the same receiving container 800 in which the backlight assembly 200 is received. The heatsink 700 is divided into a first heatsink portion 710 corresponding to the incident portion 212a, and a second heatsink portion 720 corresponding to the reflecting portion 212b.

In this embodiment, the first heatsink portion 710 has a first thickness, and the second heatsink portion 720 has a second thickness larger than the first thickness, so that a stepped portion is formed (i.e., the two portions 710 and 720 have different elevations). The light source part 220 is disposed in a space formed by the stepped portion at a first elevation, which means that the light source part 220 is disposed between the first heatsink portion 710 and the light guiding plate 210. The light source part 220 is not disposed between the second heatsink portion 720 and the light guiding plate 210. Thus, a vertical distance between the incident portion 212a of the light guiding plate 210 and a bottom surface of the first heatsink portion 710 (i.e. the perpendicular distance from portion 710) is substantially the same as a vertical distance between the reflecting portion 212b of the light guiding plate 210 and a bottom surface of the second heatsink portion 720 as measured along a normal to surface 720.

The receiving container 800 includes a bottom plate 810 and sidewalls 820 extending from the bottom plate 810 in a direction substantially perpendicular to the bottom plate 810. A receiving space is defined by the bottom plate 810 and the sidewalls 820. The backlight assembly 500 and the heatsink 700 are received in the receiving space.

The bottom plate 810 is divided into a first bottom plate 811 corresponding to the incident portion 212a, and a second bottom plate 812 corresponding to the reflecting portion 212b. A first heatsink portion 710 having a first thickness is disposed between the first bottom plate 811 and the light guiding plate 210. A second heatsink portion 720, having a second thickness larger than the first thickness, is disposed between the second bottom plate 812 and the light guiding plate 210. Thus, a vertical distance between the incident portion 212a and the first bottom plate 811 is substantially the same as a vertical distance between the reflecting portion 212b and the second bottom plate 812.

Thus, the entire sidewalls extending from the bottom plate 810 may have substantially the same height.

The light sources 221 or the printed circuit board 222 including light sources 221 directly contacts the first heatsink portion 710, so that heat generated from the light source 221 is dissipated through the first and second heatsink portions 710 and 720, and the receiving container 800. Thus, at least one of the heatsink 700 and the receiving container 800 includes a metal having high heat conductivity, so that heat from the light sources 221 may be more easily dissipated.

Thus, the display apparatus 5000 illustrated in FIG. 8 further includes a heatsink 700 in which a width of the second heatsink portion 720 larger than that of the first heatsink portion 710, so that a bottom plate of the display apparatus 5000 may be substantially planarized.

According to the present invention, a light source part is disposed under a light guiding plate, so that the bezel width of a display apparatus may be reduced. In addition, the thickness of the display apparatus may be reduced.

Furthermore, a first surface of a light guiding plate is inclined by a first angle which is an acute angle, and a first reflecting cover is disposed on the first surface, so that light from the light source part may be more effectively and completely transmitted to a display panel.

In addition, a second surface of a light guiding plate is inclined by a second angle which is an acute angle, and a second reflecting cover is disposed on the second surface, so that light from the light source part may be still more effectively and completely transmitted to a display panel, and a brightness of the display apparatus may be increased.

In addition, the display apparatus further includes a heatsink, so that heat generated from the light source part is more effectively dissipated.

The foregoing is illustrative of the present teachings and is not to be construed as limiting thereof. Although a few example embodiments of the present disclosure of invention have been described, those skilled in the art will readily appreciate from the foregoing that many modifications are possible in the example embodiments without materially departing from the novel teachings and advantages of the present teachings. Accordingly, all such modifications are intended to be included within the scope of the present teachings. In the claims, means-plus-function clauses are intended to cover the structures described herein as performing the recited function and not only structural equivalents but also equivalent structures.

What is claimed is:

1. A backlight assembly comprising:
    a light guiding plate comprising:
        a light exiting surface through which light can exit;
        a light guiding surface opposite to the light exiting surface, the light guiding surface comprising a first incident portion and a second incident portion to receive the light respectively and a reflecting portion to reflect the light;
        a first side surface extending between the light guiding surface and the light exiting surface, the first side surface inclined with respect to the light guiding surface by a first acute angle;
        a second side surface opposite to the first side surface and extending between the light guiding surface and the light exiting surface, the second side surface inclined with respect to the light guiding surface by a second acute angle;

a plurality of first light sources configured to generate the light toward the first incident portion, the first light sources being disposed only under the light guiding plate, and being disposed adjacent to a first edge connecting the first side surface of the light guiding plate with the light guiding surface;

a plurality of second light sources configured to generate the light toward the second incident portion, the second light sources being disposed under the light guiding plate and disposed adjacent to a second edge connecting the second side surface with the light guiding surface;

a first reflecting cover disposed on the first side surface and whose projected width onto the light guiding surface is larger than a width of the first incident portion;

a second reflecting cover disposed on the second side surface and whose projected width onto the light guiding surface is larger than a width of the second incident portion; and a reflecting sheet disposed under the light guiding surface corresponding to the reflecting portion.

2. The backlight assembly of claim 1, wherein the incident portion and the reflecting portion are substantially coplanar with one another.

3. The backlight assembly of claim 1, wherein at least one of the first and second reflecting covers comprises silver (Ag).

4. The backlight assembly of claim 1, wherein at least one of the first and second incident portions of the light guiding plate comprises a convex and concave surface.

5. The backlight assembly of claim 1, further comprising:
a light source lens disposed between the first incident portion and the first light sources, and configured to diffuse the light.

6. The backlight assembly of claim 2, further comprising:
a light controller disposed over the light exiting surface and configured to control the light, wherein the second reflecting cover and the reflecting sheet comprise substantially a same material.

7. The backlight assembly of claim 2, wherein
the first reflecting cover comprises first, second and third reflecting cover portions; and
wherein the first reflecting cover portion corresponds to the first side surface, and a width of the first reflecting cover portion projected onto the light guiding surface is less than or equal to a width of the first incident portion,
the second reflecting cover portion partially covers the light exiting surface and extends from a first end portion of the first reflecting cover portion, and
the third reflecting cover portion partially covers the light exiting surface and extends from a second end portion of the first reflecting cover portion.

8. A display apparatus comprising:
a backlight assembly comprising:
a light guiding plate comprising:
a light exiting surface through which light can exit;
a light guiding surface opposite to the light exiting surface, the light guiding surface comprising a first incident portion and a second incident portion to receive the light respectively and a reflecting portion to reflect the light;
a first side surface extending between the light guiding surface and the light exiting surface, the first side surface inclined with respect to the light guiding surface by a first angle, the first angle being an acute angle; and
a second side surface opposite to the first side surface and extending between the light guiding surface and the light exiting surface, the second side surface inclined with respect to the light guiding surface by a second acute angle;

a plurality of first light sources configured to generate the light toward the first incident portion, the first light sources being disposed only under the light guiding plate, and being disposed adjacent to a first edge of the light guiding plate, the first edge connecting the first side surface with the light guiding surface, a plurality of second light sources configured to generate the light toward the second incident portion, the second light sources being disposed under the light guiding plate and disposed adjacent to a second edge connecting the second side surface with the light guiding surface;

a first reflecting cover disposed on the first side surface and whose projected width onto the light guiding surface is larger than a width of the first incident portion;

a second reflecting cover disposed on the second side surface and whose projected width onto the light guiding surface is larger than a width of the second incident portion; and a reflecting sheet disposed under the light guiding surface corresponding to the reflecting portion; and a display panel disposed over the backlight assembly for displaying an image using the light.

9. The display apparatus of claim 8, wherein the incident portion and the reflecting portion are substantially coplanar with one another.

10. The display apparatus of claim 9, further comprising:
a receiving container comprising a bottom plate and sidewalls extending from the bottom plate so as to define a receiving space in which the backlight assembly is disposed.

11. The display apparatus of claim 10, further comprising:
a heatsink disposed between the light guiding surface and the receiving container and coupled to a bottom surface of the first light source, so as to dissipate heat generated from the first light source.

12. The display apparatus of claim 11,
wherein the heatsink comprises a first heatsink portion positioned proximate to the first incident portion and a second heatsink portion positioned proximate to the reflecting portion,
wherein the second heatsink portion is positioned closer to the light guiding plate than the first heatsink portion.

13. The display apparatus of claim 12,
wherein the bottom plate of the receiving container comprises a first bottom plate positioned proximate to the first heatsink portion and a second bottom plate positioned proximate to the second heatsink portion,
wherein the second bottom plate is positioned closer to the light guiding plate than the first bottom plate.

14. The display apparatus of claim 11,
wherein the heatsink comprises a first heatsink portion positioned proximate to the first incident portion and a second heatsink portion positioned proximate to the reflecting portion,
wherein a thickness of the second heatsink portion is larger than a thickness of the first heatsink portion.

15. The display apparatus of claim 14,
wherein the bottom plate of the receiving container comprises a first bottom plate positioned proximate to the first heatsink portion and a second bottom plate positioned proximate to the second heatsink portion,
wherein a perpendicular distance between the first incident portion and the first bottom plate is substantially the same as a perpendicular distance between the reflecting portion and the second bottom plate.

\* \* \* \* \*

UNITED STATES PATENT AND TRADEMARK OFFICE
CERTIFICATE OF CORRECTION

| | | |
|---|---|---|
| PATENT NO. | : 8,690,409 B2 | Page 1 of 1 |
| APPLICATION NO. | : 13/399932 | |
| DATED | : April 8, 2014 | |
| INVENTOR(S) | : Shin et al. | |

It is certified that error appears in the above-identified patent and that said Letters Patent is hereby corrected as shown below:

On the Title Page
Item [75] Inventors: fourth inventor should read as:

-- JE-WON YOO, Seoul (KR) --

Signed and Sealed this
Nineteenth Day of August, 2014

Michelle K. Lee
*Deputy Director of the United States Patent and Trademark Office*